United States Patent Office 3,522,898
Patented Aug. 4, 1970

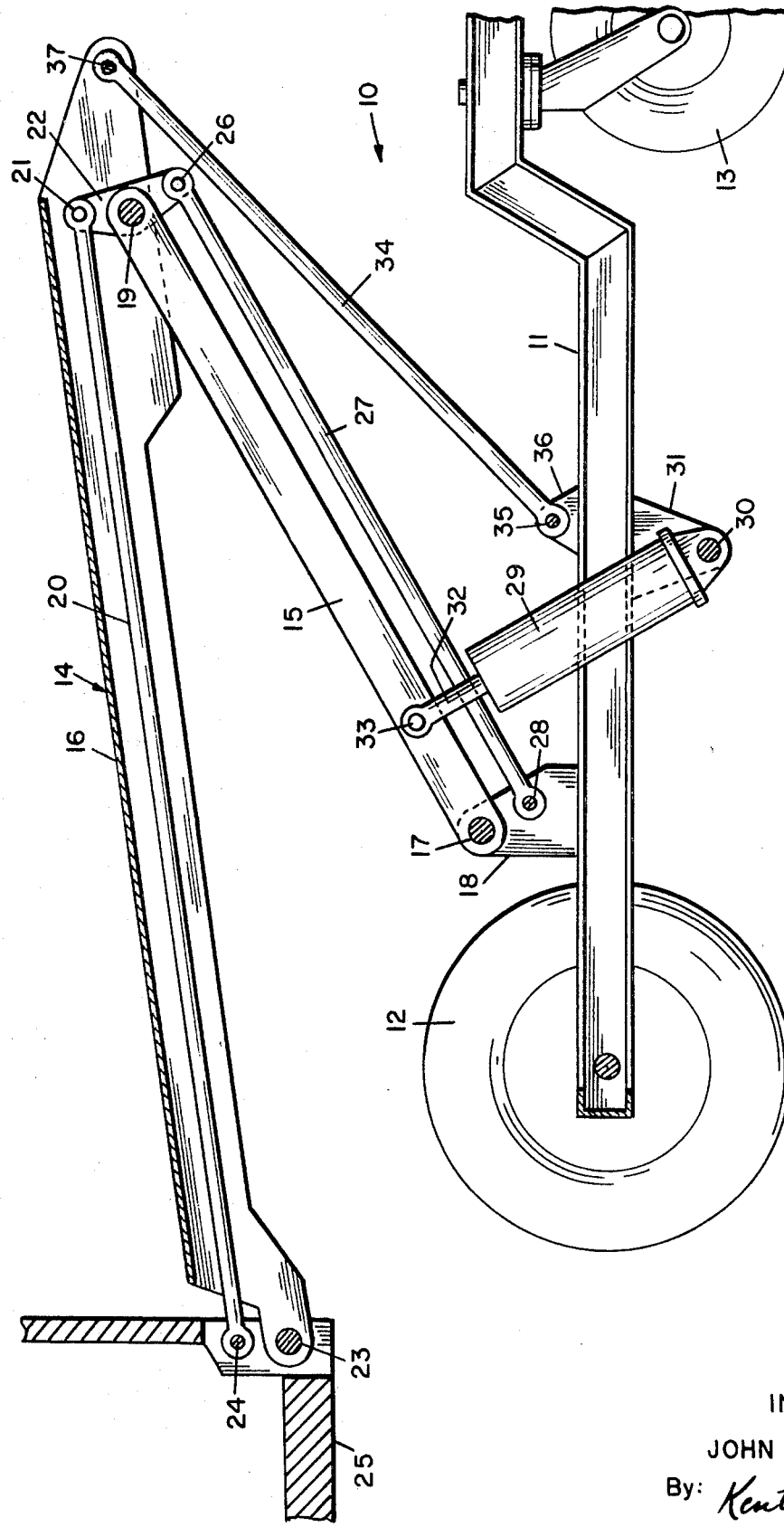

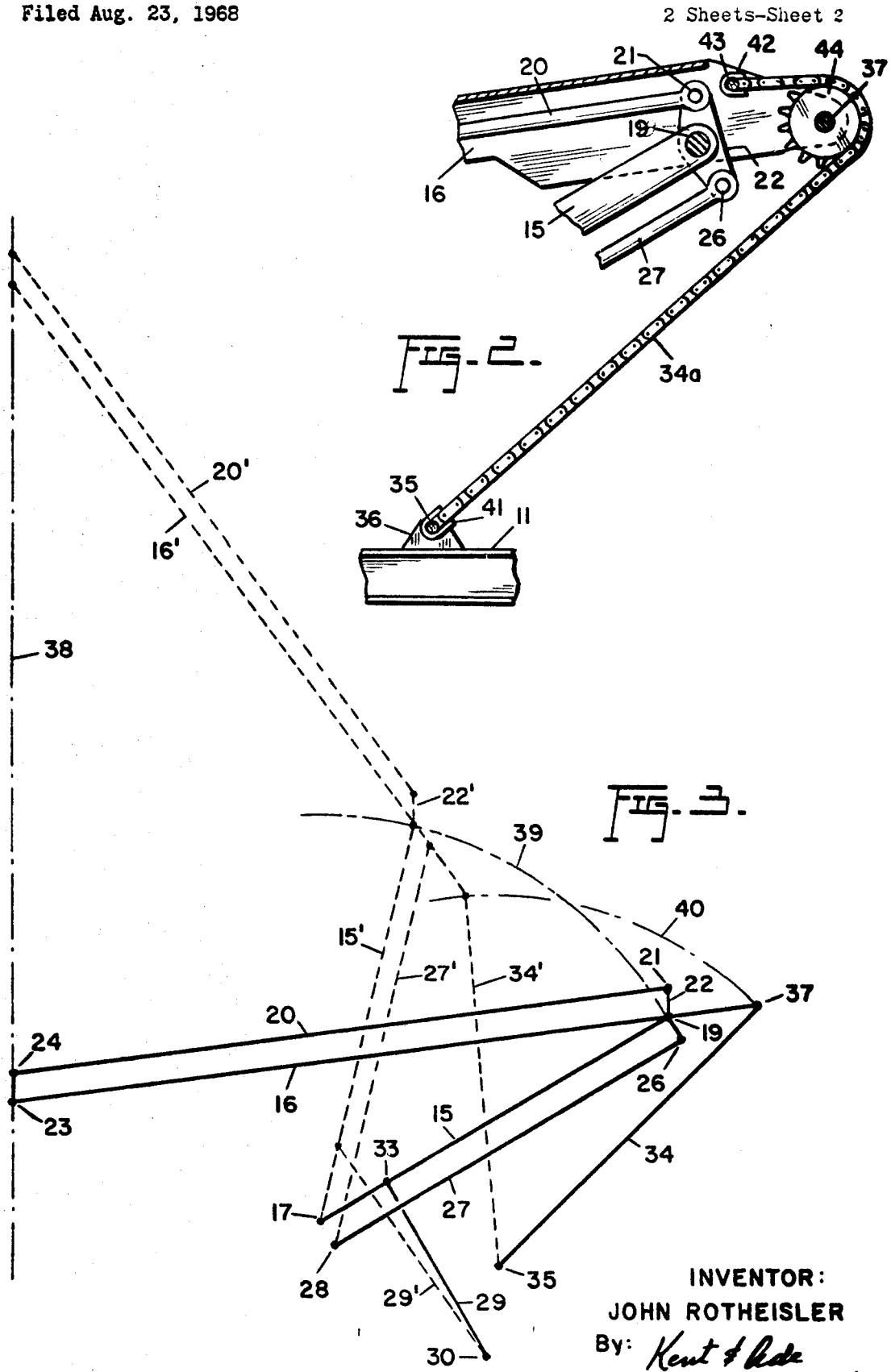

3,522,898
ELEVATING PLATFORM
John Rotheisler, Oliver, British Columbia, Canada
Filed Aug. 23, 1968, Ser. No. 754,814
Int. Cl. B66f 9/00; E02f 3/30
U.S. Cl. 214—772   3 Claims

ABSTRACT OF THE DISCLOSURE

A mobile chassis carrying a vertically swingable articulated boom consisting of pivotally connected lower and upper boom sections. A platform member is pivoted to the upper boom section and parallelogram linkage cooperates with the boom sections to maintain the platform member level during swinging of the boom. A fluid operator is connected to the lower boom section for swinging the same and an elongated guiding element extends from the chassis to the upper boom section for guiding movement of the latter so that the platform member may be raised and lowered along a substantially vertical path.

---

This invention relates to new and useful improvements in mobile elevating platforms of the general type wherein a vertically swingable, articulated boom is carried by a wheeled chassis and supports a platform member for raising and lowering movement. Devices of this type, commonly known as "cherry pickers," usually embody parallelogram linkage for maintaining the platform member level as it is raised or lowered along a path which is inherently arcuate because of pivotal connections of the boom. As a result of this arcuate path of travel, the platform member in its raised position is not directly above its lowered position, but is shifted laterally in the plane of the arcuate path. Consequently, when it is desired to raise the platform member to a given position, as for example to the side of a tree or a power line, it is difficult to estimate by what extent the platform member will be laterally translated during its raising movement and very often the platform member is raised to another than the desired position, thus requiring the whole apparatus to be repositioned on the ground. Also, the arcuate path of the platform member does not permit the same to be raised along a wall of a building, for example, without the platform member simultaneously moving away from the building wall, which again requires repositioning of the apparatus.

The principal object of this invention is to eliminate the above outlined disadvantages of conventional platforms, this being attained by the provision of an improved articulated boom structure having guide means arranged so that the boom-supported platform member may be raised and lowered along a substantially rectilinear, vertical path.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIG. 1 is a fragmentary view, partly in vertical section and partly in elevation, showing the mobile elevating platform of the invention.

FIG. 2 is a framentary view of a modified embodiment; and

FIG. 3 is a geometrical diagram showing the action of the boom.

Referring now to the accompanying drawings in detail, the mobile elevating platform of the invention is designated generally by the reference numeral 10. The same comprises a suitable chassis 11 with wheels 12, 13, it being understood that the chassis structure is conventional and carries the usual power plant for propelling the same, along with a hydraulic system including a pump for energizing a fluid operator by which the boom is actuated, these being matters which are well known in the art and require no illustration or further description herein.

In any event, the chassis 11 carries a vertically swingable, articulated boom 14, consisting of a lower boom section 15 and an upper boom section 16. The lower end of the lower boom section 15 is connected by a pivot 17 to a bracket 18 which is secured to and constitutes a component of the chassis. The upper end of the boom section 15 is connected by a pivot 19 to an end portion of the upper boom section 16, it being noted that at this end the boom section 16 projects somewhat beyond the pivot 19, as shown. Conveniently, the boom section 16 may be of an inverted U-shaped cross-section, so as to accommodate a parallelogram link 20, one end of which is pivoted as at 21 to a bell crank 22 which is swingably positioned on the pivot 19.

The outer end of the boom section 16 and the outer end of the link 20 are pivoted, as at 23 and 24, respectively, to a suitable platform member 25 which may be of any conventional type. The bell crank 22 also has pivoted thereto as at 26 one end of another parallelogram link 27, the other end of the link 27 being pivoted as at 28 to the chassis bracket 18, as will be clearly apparent. It will be understood from the foregoing that when the articulated boom 14 is raised or lowered, the parallelogram links 20, 27 serve to maintain the platform member 25 level, as is customary in the art. The boom 14 is actuated by a fluid operator 29 which is pivoted as at 30 to a chassis bracket 31 and has an extensible piston rod 32 pivoted to the lower boom section 15 as at 33.

In conjunction with the foregoing, the essence of the invention resides in the provision of a guide element 34 for the upper boom section 16. As shown in FIG. 1, the element 34 consists of a rigid link, one end of which is pivoted as at 35 to a chassis bracket 36, while its other end is pivoted as at 37 to the end of the upper boom section 16 at a point adjacent to but spaced longitudinally from the pivot 19. The aforementioned pivots 19, 23 and 37 are aligned longitudinally of the boom section 16. Moreover, the exact location of these pivots relative to one another and also relative to the pivots 17 and 35 is coordinated with the lengths of the lower boom section 15 and of the guide link 34 so that when the boom section 15 is actuated by the operator 29, the link 34 guides the movement of the boom section 16 in such manner that the platform member 25 is raised or lowered in a substantially straight, vertical path, as indicated by the dotted line 38 in FIG. 3.

FIG. 3 diagrammatically shows the boom linkage and pivot points. The solid line illustration is in the lowered position of the platform member, while the dotted line illustration is in the raised position, wherein a prime has been added to the reference numerals of the corresponding parts. It will be noted that although the boom section 15 and the guide link 34 swing in arcs indicated at 39, 40, respectively, and although the boom section 16 also swings in an arc about the pivot 19, the combined action is such as to produce a substantially rectilinear raising and lowering movement of the platform member, as already stated.

The modified embodiment of the invention shown in FIG. 2 is the same as the embodiment already described, except that the guide element 34a consists of a length of chain, instead of a rigid link such as the aforementioned link 34. One end of the chain 34a is anchored, as by a coupling 41, to the pin 35 on the chassis bracket 36, while the other end of the chain is anchored, as by a coupling 42, to a pin 43 on the upper boom section 16. The chain passes around a sprocket 44 positioned on the pin 37 of the upper boom section, as shown.

What is claimed as new is:

1. In a mobile elevating platform, the combination of a wheeled chassis, a vertically swingable articulated boom carried by said chassis, said boom including a lower section pivoted at one end thereof to the chassis and an upper section pivoted at one end thereof to the other end of said lower section, a platform member pivoted to the other end of said upper section, parallelogram linkage extending between said chassis and said platform member and cooperating with said boom sections to maintain the platform member level during swinging of the boom, means on said chassis operatively connected to the lower boom section for swinging the same, and an elongated guiding element connected at one end thereof to the chassis and at its other end to the upper boom section at a point spaced from the pivotal connection of the boom sections for guiding movement of the upper boom section so that said platform member may be raised and lowered along a substantially vertical path, said guiding element comprising an elongated flexible member having one end thereof connected to said chassis and its other end connected to said upper boom section.

2. The device as defined in claim 1 wherein said elongated flexible member is constituted by a length of chain.

3. The device as defined in claim 1 together with a guide wheel provided on said upper boom section at a point spaced from the pivotal connection of the upper and lower boom sections, said elongated flexible member passing around said guide wheel.

References Cited

UNITED STATES PATENTS

| 1,710,632 | 4/1929 | Main et al. | 214—772 X |
| 3,176,792 | 4/1965 | Olson | 182—2 |

HUGO O. SCHULZ, Primary Examiner

U.S. Cl. X.R.

214—773